Aug. 22, 1939.  W. H. FRANK  2,170,298
ELECTRICAL DISTRIBUTION SYSTEM
Original Filed Nov. 16, 1936  4 Sheets-Sheet 1

INVENTOR.
William H. Frank
BY Daniel G. Cullen
ATTORNEY.

Aug. 22, 1939.   W. H. FRANK   2,170,298
ELECTRICAL DISTRIBUTION SYSTEM
Original Filed Nov. 16, 1936   4 Sheets-Sheet 2

INVENTOR.
William H Frank
BY
Daniel G Cullen
ATTORNEY.

Aug. 22, 1939.  W. H. FRANK  2,170,298
ELECTRICAL DISTRIBUTION SYSTEM
Original Filed Nov. 16, 1936  4 Sheets-Sheet 3

INVENTOR.
William H. Frank
BY Daniel G. Cullen
ATTORNEY.

Aug. 22, 1939.   W. H. FRANK   2,170,298
ELECTRICAL DISTRIBUTION SYSTEM
Original Filed Nov. 16, 1936   4 Sheets-Sheet 4

INVENTOR.
William H. Frank
BY Daniel G. Cullen
ATTORNEY.

Patented Aug. 22, 1939

2,170,298

UNITED STATES PATENT OFFICE 2,170,298

ELECTRICAL DISTRIBUTION SYSTEM

William H. Frank, Detroit, Mich.

Application November 16, 1936, Serial No. 110,953
Renewed April 9, 1938

11 Claims. (Cl. 191—23).

This application relates to electrical distribution systems of the duct and trolley type and discloses a system characterized by the fact that the trolley is designed to ride outside of the duct, with its contacts only entering the duct through narrow slots thereof to engage the bus bars therein.

The duct hereof is characterized by the fact that it is of relatively small cross sectional area. The outside surfaces thereof form supporting and thrust surfaces for the trolleys; it is closed throughout its entire periphery except for a plurality of extremely narrow slots therein behind which, inside of the duct, are mounted bus bars, these being engaged by contact rollers of trolleys, which contact rollers are the only parts of the trolley that dispose themselves even partially within the duct.

The duct hereof is further characterized by the simplicity of its construction. It comprises nothing more than a flanged U trough of sheet metal to whose flanges are secured two strips of insulation; in the duct is disposed a third strip of insulation extending to and substantially filling the slot between the two first mentioned strips to transform that slot into two extremely narrow slots; to the third strip, on opposite sides thereof, are secured bus bars aligned with the narrow slots between the center strip and each of the two edge strips of insulation.

The duct hereof is further characterized by the fact that it is completely closed except for narrow slots thereof which provide the only access paths to the bus bars within the duct, whereby these are thus guarded against accidental contact.

For an understanding of the system herein, reference should be had to the appended drawings. In the drawings.

The duct

Figure 1:
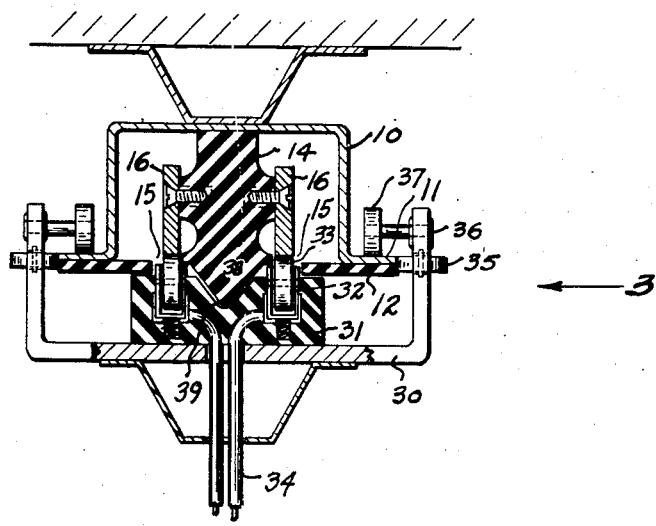
Fig. 1 shows a duct and trolley of the invention in transverse section.

The duct comprises a sheet metal casing 10 of uniform cross section disposed in the form of an inverted U and having flanges 11 to which are secured insulation strips 12. Within the duct is securely mounted a thick and heavy strip 14 of insulation arranged to extend to and fill substantially the space between the strips 12 except for two narrow slots 15 with which are alined and registered bus rails 16 secured to the strip 14 by screws as shown. The arrangement provides a substantially closed duct having therein bus rails exposed through extremely narrow slots of an insulated wall of the duct.

Figure 2:
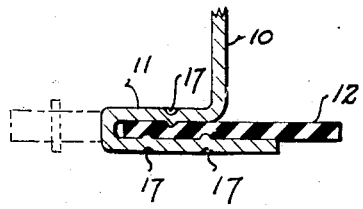
Fig. 2 is a fragmentary duct detail.
Figure 3:
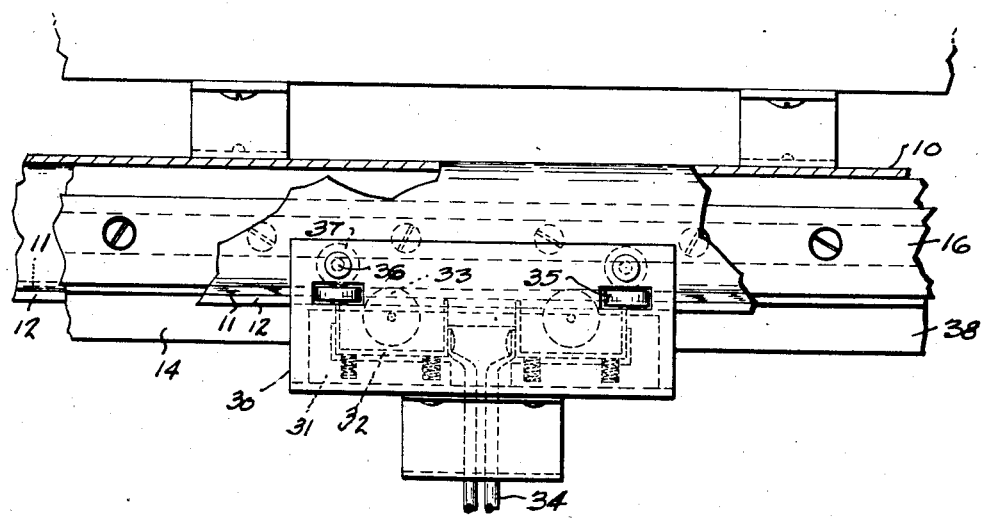
Fig. 3 is a longitudinal view of the duct with a trolley therein.
Figures 6, 7:
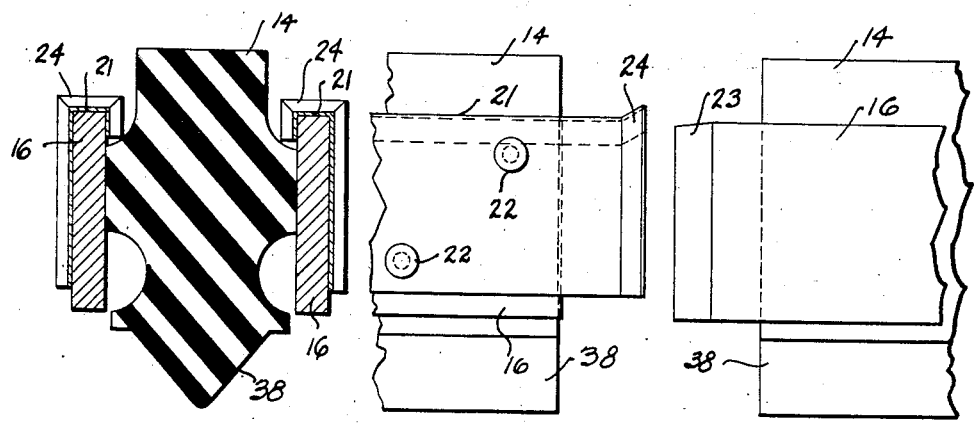
Figs. 6 and 7 show bus coupling means.
Figure 4:
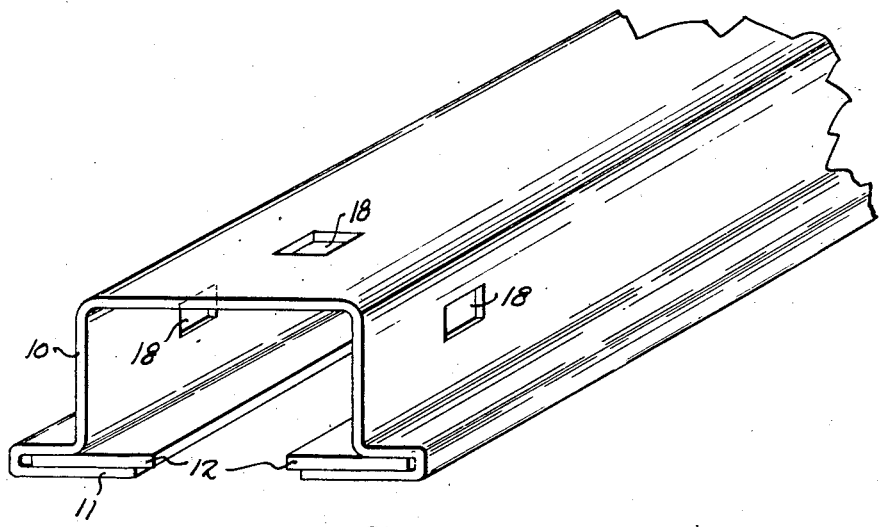
Figs. 4 and 5 show duct splicing means.
Figure 5:
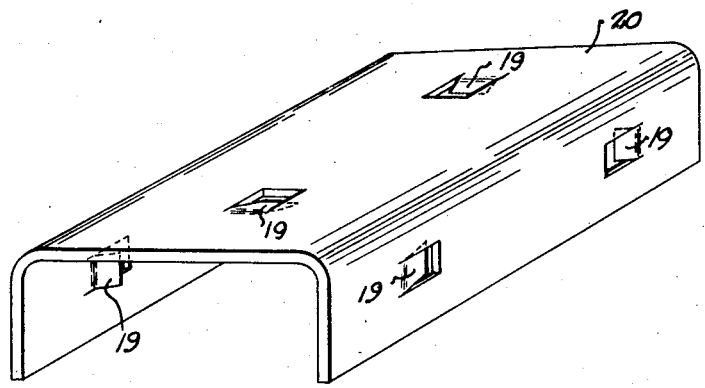

The strips 12 may be secured to the flanges 11 of the duct in any suitable manner, as for example by rivets, not shown. Another arrangement is disclosed in Fig. 2 which shows how the flanges 11 are bent around the edges of the strips to define longitudinal pockets receiving such edges; the flanges, on opposite sides thereof, are crimped as shown at 17 to aid in interlocking the strips 12 to the flanges 11.

The duct is made in sections of uniform length and these may be provided at their ends with notches 18 on their top and side surfaces for the reception of tongues 19 on the similar surfaces of an inverted U-shaped splice plate 20 which may be utilized to splice the duct sections at their adjacent ends.

For coupling the bus bars where the duct section ends are spliced, suitable couplers may be provided. These comprise inverted J-shaped sleeves 21 riveted at 22 to bus bar ends and projecting beyond such ends to define pockets receiving the projecting ends of the bus bars of other sections; and to insure automatic and facile reception of such bus bar ends by straps 21, such bus bar ends are scarfed as shown at 23 and the straps are flared as shown at 24.

For use with the duct here shown there may be provided a trolley comprising a U-shaped carriage 30 on whose bight are securely mounted insulation blocks 31 containing spring biased metal cups 32 journalling narrow contact rollers 33 adapted to ride on the edges of the bus bars 16 exposed at slots 15 and thus transfer current from such bus bars through the rollers 33 and the metal cups 32 to the load conductors 34 whose terminals are secured to the cups 32.

The legs 31 of the U-shaped carriage have slots receiving side thrust rollers 35 journalled in such legs; such legs also support axles 36 on which are mounted supporting rollers 37.

It will be observed that when a trolley is associated with a duct, supporting rollers 37 ride on the flanges 11 of the duct, side thrust rollers 35 ride against the edges of such flanges, and that collectors 33 partially enter the duct through the slots 15 and ride against the lower edges of the bus rails 16.

In order to insure against rollers 33 striking the edges of the slots 15 as a trolley is associated with a duct, guiding formations are provided on the insulation strip 14 of the duct and the insulation blocks 31 of the trolley. In the formation shown such guiding formation comprises a V-shaped rib 38 formed on the strip 14 and projecting downwardly and mating with a V-shaped groove 39 formed in the upper surfaces of the blocks 31. If desired, however, the ribs may be formed on the blocks to mate with a groove on the strip, in a manner not shown but well within the purview of this application.

A trolley may be formed so that it may be detached from a duct or applied thereto at any point of the latter; or, as an alternative, the duct may be formed with openings at suitable intervals, normally closed by movable parts of the duct, whereby trolleys may be removed from the duct or applied thereto through such openings.

Figure 8:
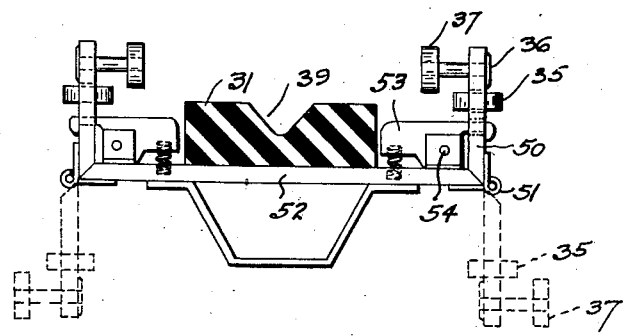
Figs. 8 and 9 illustrate alternative arrangements of trolley parts for permitting removal of trolleys from duct.
Figure 9:
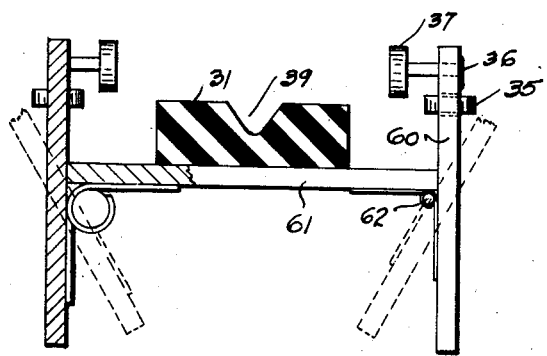

Suitable arrangements of the trolleys for this purpose are shown in Figs. 8 and 9.

In the arrangement of Fig. 8 the legs 50 of the U-shaped carriage are shown as hingedly connected at 51 to the bight 52 of such plate whereby they may be swung on their hinges to open the trolley and thus permit it to be removed from or applied to a duct or closed in to make the trolley non-removable from or non-applicable to a duct. Suitable spring pressed latches 53 may be pivotally mounted on the bight at 54 to project through slots of the legs 50 and hook over the edges thereof to latch such legs in closed position. The latches may be manipulated readily to release the legs and permit them to drop and open the trolley.

In the arrangement of Fig. 9 the legs 60 of the U-shaped carriage plate are also shown as hingedly connected to the bight 61 thereof by means of spring hinges 62 which normally bias the legs to their closing position, but which permit the legs to be manipulated and swung to their trolley open position.

Figure 10:
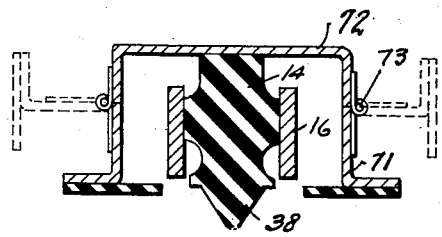
Fig. 10 shows an arrangement of duct parts for permitting removal of trolleys from duct.

In the arrangement of Fig. 10 the legs 71 of the U-shaped casing or duct are shown as connected to the bight 72 thereof by means of hinges 73 permitting these legs to be swung open for trolley removal or insertion. The legs are normally in their duct closing position due to the influence of gravity, the load of the trolley on the flanges of the duct, and the thrust of the trolley against the edges of such flanges. However, if desired, a suitably designed lock may be provided to maintain the legs 71 in duct closing position and this lock may be made manipulable to permit the legs to be swung to duct opening position.

While the embodiment disclosed contains but two bus bars, it is obvious that more or less than two, as needed, might be used; and that other splicers, hangers, couplers, etc., than those shown might be used as desired; and that the wall which is doubly slotted, as at 15, need not be of insulation, but might be of metal, if desired, in which case, the trolley contacts might be shielded and insulated, if necessary.

It will further be observed that the insulation strip 14 of the duct forms a barrier between the bus bars 16 of opposite polarity and that it also forms a barrier between the sparking surfaces within the duct, namely the lower edges of the bus bars, at the time that the rollers 33 are riding along these sparking edges, and that the completion of the barrier is effected by the co-operation of the block 31 of the trolley which mounts the contacts 33 and also forms a barrier between these contacts.

As shown in Fig. 1, the disposition of the wedge edge 38 of the insulation strip 14 in the groove 39 of the trolley creates a cooperation between parts 14 and 31 for barrier completion.

Now having described the trolley and duct system hereof, reference will be had to the claims which follow for a determination of the protection sought herein.

I claim:

1. A trolley duct system comprising a duct having a plurality of parallel longitudinal narrow slots in a single wall thereof and trolley supporting rails external thereof and projecting from the main body of the duct, bus bars within the duct and aligned with the slots, and trolleys outside the duct and having load and thrust rollers outside the duct and riding on the rails thereof and having contact rollers outside the duct and riding in the slots thereof along the bus bars.

2. A trolley duct system comprising a duct having a plurality of parallel longitudinal narrow slots in a single wall thereof and trolley supporting rails external thereof and projecting from the main body of the duct, bus bars within the duct and aligned with the slots, and trolleys outside the duct and having load and thrust rollers outside the duct and riding on the rails thereof and having contact rollers outside the duct and riding in the slots thereof along the bus bars, the rails being substantially coplanar with the slotted wall.

3. A trolley duct having a plurality of parallel longitudinal narrow slots in a single wall thereof and trolley supporting rails external thereof and projecting from the main body of the duct, bus bars within the duct and alined with the slots and supported on a wall other than the slotted wall, and trolleys outside the duct and having load and thrust rollers outside the duct and riding on the rails thereof and having contact rollers outside the duct and riding in the slots thereof along the bus bars.

4. A trolley duct comprising a U-shaped trough having its open side substantially closed by three separate parallel longitudinally extending strips separated by two narrow parallel longitudinally extending slots, two of the strips being secured to the ends of the legs of the U and one of the strips being secured to the bight of the U and extending to and disposed in the space between the other two strips, and bus bars on the third strip and aligned with the slots the duct having trolley supporting rails external thereof and projecting from the main body of the duct.

5. A trolley duct system comprising a duct having a plurality of parallel longitudinal narrow slots in a single wall thereof and trolley supporting rails external thereof and projecting from the main body of the duct, bus bars within the duct and aligned with the slots and supported on a wall other than the slotted wall, and trolleys outside the duct and having load and thrust rollers outside the duct and riding on the rails thereof and having contact rollers outside the duct and riding in the slots thereof along the bus bars, the rails being substantially coplanar with the slotted wall.

6. A trolley duct comprising a U-shaped trough having its open side substantially closed by three separate parallel longitudinally extending strips separated by two narrow parallel longitudinally extending slots, two of the strips being secured to the ends of the legs of the U and one of the strips being secured to the bight of the U and extending to and disposed in the space between the other two strips, and bus bars on the third strip and aligned with the slots, the duct having trolley supporting rails external thereof and projecting from the main body of the duct and formed as flanges of the legs of the U at their ends.

7. A trolley duct system comprising the combination of a slotted duct containing continuous bus tracks of different polarity and of an aggregate cross section considerably less than that of the duct and having a plurality of continuous narrow slots alined with the tracks individually, one for each track, and collectors arranged to slide along the duct and on the outside thereof, with each having individual sets of contact making elements, these, in each collector, being relatively insulated and relatively movable and proportioned to have parts projected into and slide within the duct slots in engagement with the bus tracks, the duct parts, between the slots, isolating not only the duct parts of different polarities, but also the trolley parts of different polarities.

8. A trolley duct comprising a tube having adjacent parallel slots, bus bars within the duct and alined with and exposed through the slots, an insulation strip within the duct and between the bus bars and isolating them from each other, and a trolley having roller contacts insertable into the duct through the slots for engaging the bus bars and an insulation block on the trolley between the roller contacts for isolating them from each other, the insulation strip cooperating with the insulation block, when the trolley is in position to ride along the duct, to form a complete barrier between one bus bar and contact set and the other bus bar and contact set.

9. A trolley duct comprising a tube having adjacent parallel slots, bus bars within the duct and alined with and exposed through the slots, an insulation strip within the duct and between the bus bars and isolating them from each other, and a trolley having roller contacts insertable into the duct through the slots for engaging the bus bars and an insulation block on the trolley between the roller contacts for isolating them from each other, the bus bars and the roller contacts being mounted on the insulation barriers between them, the insulation strip cooperating with the insulation block, when the trolley is in position to ride along the duct, to form a complete barrier between one bus bar and contact set and the other bus bar and contact set.

10. A trolley duct comprising a tube having adjacent parallel slots, bus bars within the duct and alined with and exposed through the slots, an insulation strip within the duct and between the bus bars and isolating them from each other, and a trolley having roller contacts insertable into the duct through the slots for engaging the bus bars and an insulation block on the trolley between the roller contacts for isolating them from each other, the insulation strip cooperating with the insulation block, when the trolley is in position to ride along the duct, to form a complete barrier between one bus bar and contact set and the other bus bar and contact set, the duct having externally exposed tracks and the trolley having supporting rollers riding thereon outside the duct.

11. A trolley duct comprising a tube having adjacent parallel slots, bus bars within the duct and alined with and exposed through the slots, an insulation strip within the duct and between the bus bars and isolating them from each other, and a trolley having roller contacts insertable into the duct through the slots for engaging the bus bars and an insulation block on the trolley between the roller contacts for isolating them from each other, the bus bars and the roller contacts being mounted on the insulation barriers between them, the insulation strip cooperating with the insulation block, when the trolley is in position to ride along the duct, to form a complete barrier between one bus bar and contact set and the other bus bar and contact set, the duct having externally exposed tracks and the trolley having supporting rollers riding thereon outside the duct.

WILLIAM H. FRANK.